(12) United States Patent
Ropers

(10) Patent No.: US 11,254,440 B2
(45) Date of Patent: Feb. 22, 2022

(54) RELATIVE NAVIGATION AND MACHINE VISION FOR AUTOMATED AERIAL REFUELING SYSTEM AND METHOD

(71) Applicant: Rockwell Collins, Inc., Cedar Rapids, IA (US)

(72) Inventor: Michael A. Ropers, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 299 days.

(21) Appl. No.: 16/534,475

(22) Filed: Aug. 7, 2019

(65) Prior Publication Data

US 2021/0039804 A1    Feb. 11, 2021

(51) Int. Cl.
*B64D 39/06* (2006.01)
*B64D 45/00* (2006.01)
*B64D 47/08* (2006.01)
*G06T 7/70* (2017.01)

(52) U.S. Cl.
CPC ......... *B64D 39/06* (2013.01); *B64D 45/0005* (2013.01); *B64D 47/08* (2013.01); *G06T 7/70* (2017.01); *G06T 2207/10016* (2013.01); *G06T 2207/30252* (2013.01)

(58) Field of Classification Search
USPC .......................................................... 701/3
See application file for complete search history.

(56) References Cited

U.S. PATENT DOCUMENTS

| 5,302,816 A | 4/1994 | Tulet |
| 5,904,729 A | 5/1999 | Ruzicka |
| 6,966,525 B1 * | 11/2005 | Schroeder .............. B64D 39/00 244/135 A |
| 7,499,794 B1 | 3/2009 | Bailey et al. |
| 7,768,451 B2 | 8/2010 | Wu et al. |

(Continued)

FOREIGN PATENT DOCUMENTS

| EP | 1747991 A2 | 1/2007 |
| EP | 3772464 A1 | 2/2021 |

OTHER PUBLICATIONS

Extended Search Report for European Application No. 19215380.7 dated Jul. 10, 2020, 4 pages.

*Primary Examiner* — Tyler D Paige

(74) *Attorney, Agent, or Firm* — Suiter Swantz pc llo

(57) ABSTRACT

A system and method for Automated Aerial Refueling (AAR) may combine unrelated capabilities to provide a high integrity solution to boom manipulation and insertion to couple with a receiver receptacle. Precise positioning systems on each aircraft coupled via data link provide a high integrity relative positioning solution generating a requisite integrity for positioning yet insufficient for boom insertion. High definition cameras onboard the tanker provide multi-wavelength remote vision digital images used to identify the boom fitting as well as the receptacle. Combined with boom position information from the tanker, the system determines pixel position inputs from stereo digital images to precisely identify the boom and receptacle and manipulate the boom to insert the boom fitting into the receptacle. Constant camera generated feedback and updated relative positioning alerts the system and disconnects the boom should the receiver aircraft stray outside the proper position.

15 Claims, 7 Drawing Sheets

(56) References Cited

U.S. PATENT DOCUMENTS

| | | | |
|---|---|---|---|
| 7,965,223 | B1 | 6/2011 | McCusker |
| 8,193,948 | B1 | 6/2012 | Shapiro et al. |
| 8,433,459 | B2 | 4/2013 | Michel et al. |
| 8,698,654 | B2 | 4/2014 | He |
| 8,786,467 | B2 | 7/2014 | Clark et al. |
| 9,189,964 | B1 | 11/2015 | Rathinam et al. |
| 9,347,794 | B1 | 5/2016 | Tiana et al. |
| 9,517,844 | B2 | 12/2016 | Khatwa et al. |
| 10,274,606 | B1 | 4/2019 | Phan et al. |
| 2004/0102876 | A1* | 5/2004 | Doane ............... B64C 13/20 701/9 |
| 2006/0000949 | A1 | 1/2006 | Schroeder |
| 2006/0284019 | A1* | 12/2006 | Takacs ............... B64D 39/00 244/135 A |
| 2010/0256838 | A1* | 10/2010 | Stecko ............... B64D 39/00 701/3 |
| 2013/0009011 | A1* | 1/2013 | Fernandez Garcia . B64D 39/02 244/135 A |
| 2015/0293225 | A1* | 10/2015 | Riley ............... G08G 5/0095 356/4.01 |
| 2020/0175151 | A1* | 6/2020 | Sanders-Reed ....... G06F 21/121 |

\* cited by examiner

RELATIVE NAVIGATION AND MACHINE VISION FOR AUTOMATED AERIAL REFUELING SYSTEM AND METHOD

BACKGROUND

Traditional aerial refueling methods may require a boom operator onboard the tanker aircraft to physically manipulate controls of a boom to "fly" the boom into a receptacle onboard a receiving aircraft. In some tankers, the boom operator may lie in a face down position and physically view the receiving aircraft through a window. In others, the boomer may sit at a station onboard the tanker and view a video of the receiving aircraft provided by one or more cameras located on the tail of the tanker.

In either case, the boomer must manually place the boom into the receiver's receptacle using a joystick or other interface to manipulate the tip of the boom in a three-dimensional arena to couple with the receptacle.

Humans may become fatigued. Visibility may often be reduced. Human perceptions may be inaccurate. Boomers may have inadequate experience for night or reduced visibility operations. Should the boomer erroneously strike the skin or body of a receiving aircraft, substantial damage may occur compromising mission success and aircraft integrity. Modern aircraft with stealth coating may be particularly susceptible to mission degrading damage from even the slightest boom strike.

Automated Aerial Refueling (AAR) may address a number of issues with current aerial refueling capabilities and provide a number of solutions to those issues. AAR has the potential to provide for life cycle cost savings to an operator by reducing both personnel and equipment required for a refueling evolution. AAR may also increase available fuel and cargo capacity.

Current positioning systems may provide a rudimentary level of positioning accuracy. However, these positioning systems may not support highly sophisticated and precise boom placement within a receiver receptacle. Some hybrid methods of relative navigation may provide a greater level of relative positioning but still lack a level of precision required for boom insertion into the receptacle.

Machine vision systems may provide accuracy, but are unable to provide integrity to ensure positive relative positioning between aircraft. Global Positioning Systems (GPS) based relative navigation may provide integrity at GPS carrier wavelength position accuracies (~20 cm). However, neither system alone is sufficient to enable AAR, which requires high integrity due to proximity between aircraft, and high accuracy due to precise placement of the boom into the receptacle.

Therefore, a need remains for a system and related method which may overcome these limitations and provide a novel solution to AAR using high integrity relative positioning methods in cooperation with highly accurate machine vision systems.

SUMMARY

In one aspect, embodiments of the inventive concepts disclosed herein are directed to a system for automated boom placement in aerial refueling. The system may comprise a tanker positioning system operatively coupled with a tanker flight control computer (FCC) onboard a tanker aircraft and a camera suite onboard the tanker aircraft. To manipulate a refueling boom, the system may include a boom manipulating system onboard the tanker aircraft configured to three dimensionally manipulate a refueling boom onboard the tanker aircraft, the refueling boom having a boom male fitting.

The system may include a tanker controller onboard the tanker aircraft operatively coupled with the tanker positioning system, the tanker FCC, the camera suite, and the boom manipulating system and a data link operatively coupling the tanker controller with a receiver controller onboard a receiver aircraft, the receiver controller operatively coupled with a receiver positioning system and a receiver FCC, the receiver aircraft having a receiver female fitting.

To support the tanker controller, the system may include a tangible, non-transitory memory configured to communicate with the tanker controller, the tangible, non-transitory memory having instructions stored therein that, in response to execution by the tanker controller, cause the tanker controller to carry out the function of the system. The system may function to receive a positioning solution from the tanker positioning system, receive a positioning solution from the receiver positioning system via the data link, and generate a high integrity relative positioning solution based on the received positioning solutions. To preclude midair of the aircraft, the system may generate safety boundaries around each of the tanker aircraft and the receiver aircraft based on the HIRPS, the at least two safety boundaries including a tanker protection level and a tanker alert limit, a receiver protection level and a receiver alert limit, the protection levels smaller than the alert limits.

To accurately place the boom male fitting, the system may receive a video signal from the camera suite, the camera suite configured for sensing a field of view (FOV) proximal with the refueling boom and identify, based on the video signal, the boom male fitting and the receiver female fitting. Once identified, the system may determine, based on the video signal, a three-dimensional position of the boom male fitting and a three-dimensional position of the receiver female fitting and generate a boom limit container around the boom male fitting based on the three-dimensional position of the boom male fitting. The system may monitor each of: 1) the safety boundaries and 2) the three-dimensional position of the receiver female fitting relative to the boom limit container and send an alert if either protection level reaches either alert limit and if the three-dimensional position of the receiver female fitting exceeds the boom limit container. The system may manipulate, if the three-dimensional position of the receiver female fitting is within the boom limit container, the refueling boom to couple the boom male fitting with the receiver female fitting based on the three-dimensional position of the boom male fitting relative to the three-dimensional position of the receiver female fitting.

A further embodiment of the inventive concepts disclosed herein may include a method for automated boom placement in aerial refueling. The method may comprise receiving a tanker positioning solution for a tanker aircraft and receiving a receiver positioning solution for a receiver aircraft. For a high integrity positioning determination, the method may include generating a High Integrity Relative Positioning Solution (HIRPS), based on the tanker positioning solution and the receiver positioning solution. The method may further include generating at least two safety boundaries around each of the tanker aircraft and the receiver aircraft based on the HIRPS, the safety boundaries including a protection level and an alert limit, the protection level smaller than the alert limit. For safety, the method may include continuously comparing each protection level to each alert limit and sending an alert if either protection level reaches either alert limit. For accurate boom positioning, the method may include sensing a boom position, receiving a video signal of a FOV proximal with the boom position and identifying, based on the video signal, a boom male fitting coupled with a refueling boom and a receiver female fitting onboard the receiver aircraft.

The method may include determining, based on the video signal, a three-dimensional position of the boom male fitting, a three-dimensional position of the receiver female fitting and a boom limit container around a centered position of the boom male fitting based on the three-dimensional position of the boom male fitting. To ensure accurate boom placement is possible, the method may include continuously comparing the three-dimensional position of the receiver female fitting to the boom limit container and manipulating, if the three-dimensional position of receiver female fitting is within the boom limit container, a refueling boom to couple the boom male fitting with the receiver female fitting based on the three-dimensional position of the boom male fitting relative to the three-dimensional position of the receiver female fitting It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
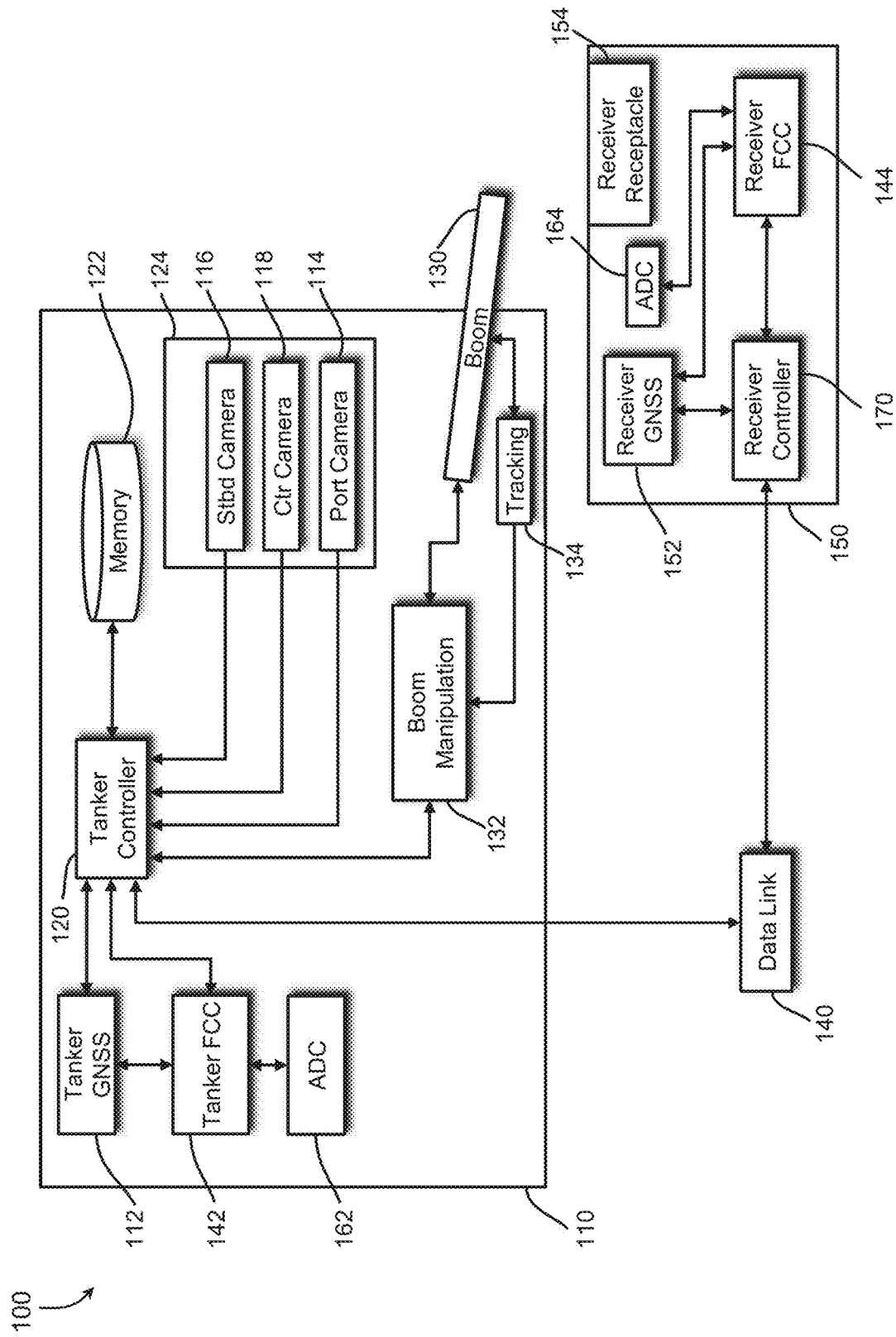
FIG. 1 is a diagram of a system for automated boom placement in aerial refueling in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for Automated Aerial Refueling (AAR) may combine unrelated capabilities to provide a high integrity solution to boom manipulation and insertion to couple with a receiver receptacle. Precise positioning systems on each aircraft coupled via data link provide a high integrity relative positioning solution generating a requisite integrity for positioning yet insufficient for boom insertion. High definition cameras onboard the tanker provide multi-wavelength remote vision digital images used to identify the boom fitting as well as the receptacle. Combined with boom position information from the tanker, the system determines pixel position inputs from stereo digital images to precisely identify the boom and receptacle and manipulate the boom to insert the boom fitting into the receptacle. Constant camera generated feedback and updated relative positioning alerts the system and disconnects the boom should the receiver aircraft stray outside the proper position

| REFERENCE CHART | | |
|---|---|---|
| 100 | System for Auto AR | |
| 110 | Tanker Aircraft | |
| 112 | Tanker Positioning System | |
| 114 | Port Tail Camera | |
| 116 | Stbd Tail Camera | |
| 118 | Center Tail Camera | |
| 120 | Tanker Controller | |
| 122 | Memory | |
| 124 | Camera Suite | |
| 130 | Boom | |
| 132 | Boom Manipulating System | |
| 134 | Boom Tracking System | |
| 140 | Data Link | |
| 142 | Tanker FCC | |
| 144 | Receiver FCC | |
| 150 | Receiver Aircraft | |
| 152 | Receiver Positioning System | |
| 154 | Receiver Receptacle | |
| 156 | Receiver Canopy | |
| 158 | Receiver Left Vertical Tail | |
| 160 | Receiver Left Horizontal Tail | |
| 162 | Tanker ADC | |
| 164 | Receiver ADC | |
| 170 | Receiver Controller | |
| 200 | AR Side View | |
| 214 | Tail Camera FOV | |
| 218 | IR Illuminator | |
| 250 | Right Door | |
| 252 | Left Door | |
| 254 | Receiver Female Fitting | |
| 256 | Guide Markings | |
| 258 | Right Vertical Tail | |
| 260 | Rear Empennage | |
| 262 | Right Wing | |
| 264 | Left Wing | |
| 266 | Receiver Number | |
| 280 | Tanker Protection Level | |
| 282 | Tanker Alert Limit | |
| 290 | Receiver Protection Level | |
| 292 | Receiver Alert Limit | |
| 294 | Boom Limit Container | |
| 300 | Receiver Detail View | |
| 400 | Boom Detail View | |
| 402 | Boom Male Fitting | |
| 404 | Boom Extension | |
| 406 | Min Red Stripe | |
| 408 | Min Red Chevrons | |
| 410 | Min Yellow Stripe | |
| 412 | Min Yellow Chevrons | |
| 414 | Green with Yellow Apple | |
| 416 | Max Yellow Chevrons | |
| 418 | Max Yellow Stripe | |
| 420 | Max Red Chevrons | |
| 422 | Max Red Stripe | |
| 430 | Boom Housing | |
| 432 | Boom Horizontal Stabilizer | |
| 434 | Boom Vertical Stabilizer | |
| 500 | Logic Flow | |
| 502 | Receive Tanker Position | |
| 504 | Receive Receiver Position | |
| 506 | Generate HIRPS | |
| 508 | Generate PL and AL Safety Boundaries | |
| 510 | Both PL within the AL? | |
| 512 | Receive Video Signal | |
| 514 | ID Male Fitting and Female Fitting | |
| 516 | Determine 3D Positions | |
| 518 | Generate Boom Limit Container | |
| 520 | Receptacle within Boom Limit Container | |
| 522 | Manipulate Boom to Couple | |
| 524 | Maintaining Boom Limit Container? | |
| 526 | Offload Complete? | |
| 528 | Execute Normal Breakaway | |

| REFERENCE CHART | | |
|---|---|---|
| 530 | Send Alert | |
| 532 | Execute Emergency Breakaway | |
| 600 | Method Flow | |
| 602 | Receive Tanker Position | |
| 604 | Receive Receiver Position | |
| 606 | Generate High Integrity Relative Positioning Solution | |
| 608 | Generate PL and AL Safety Boundaries | |
| 610 | Continuously Comparing and Updating | |
| 612 | Receiving A Video Signal | |
| 614 | ID Male Fitting and Female Fitting | |
| 616 | Determine 3D Positions | |
| 618 | Determine boom limit container | |
| 620 | Continuously Comparing Receiver Female Fitting to The Boom Limit Container | |
| 622 | Manipulating the Boom to Couple | |

FIG. 1 System

Referring now to FIG. 1, a diagram of a system for automated boom placement in aerial refueling in accordance with an embodiment of the inventive concepts disclosed herein is shown. Generally, a system for automated boom placement in aerial refueling 100 may combine two separate technologies to create a system of high accuracy and integrity enabling AAR. Machine vision may be highly accurate but inherently possess little integrity while relative navigation differential GPS may be highly accurate (e.g., approximately 20 cm) but not accurate enough for AAR. The relative navigation may provide a high integrity solution between two closely maneuvering aircraft protecting against misleading information which could lead to a midair collision. Once the relative navigation solution provides the aircraft with the guidance to arrive at and maintain a contact position, the machine vision provides the accuracy to perform the AAR.

In one embodiment of the inventive concepts disclosed herein, the system 100 may be functional onboard a tanker aircraft (tanker) 110 equipped with a refueling boom 130 (boom). A receiver aircraft 150 (receiver) may be a recipient of an offload of fuel from the tanker 110. Onboard the tanker 110, a tanker positioning system 112 (hereinafter tanker global navigation satellite system (GNSS)) may function to determine a precise positioning solution of the tanker 110.

As used herein, the GNSS may refer generically to any precise positioning system configured for receiving positioning signals from a space-based transmitter and using the received signals to provide a precise positioning solution. Contemplated herein, the system 100 may function using any type of global satellite system including a global positioning system (GPS) as well as others including, for example, a GLONASS, a Galileo, and a BeiDou system.

Further elements onboard the tanker 110 may include a tanker controller 120 operatively coupled with the tanker GNSS 112, a tanker flight control computer (FCC) 142, a camera suite 124, a boom manipulating system 132 and a memory 122.

The tanker FCC 142 may function as a traditional point control flight control processor receiving inputs from, for example, air data, an autopilot and flight crew and generating outputs such as commands to flight controls and management of fuel.

The camera suite 124 may be configured for sensing an area under a tail of the tanker proximal with the refueling boom 130. Each camera within the camera suite 124 may be configured with a Field of View (FOV). The camera suite 124 may include a port tail camera 114, a starboard tail camera 116, and a center tail camera 118. Contemplated herein, two cameras may suffice to accurately image the required elements. In embodiments, the camera suite may comprise two cameras configured for stereoscopic sensing of the FOV proximal with the refueling boom as well as one or more cameras configured for sensing a plurality of wavelengths. The system 100 may employ a plurality of cameras to effectively image, in a variety of atmospheric conditions, the area beneath the tail of the tanker 110.

The boom manipulating system 132 may include a plurality of types of servos, actuators, and airfoils which may act on the boom 130 to three dimensionally manipulate the boom 130 (e.g. laterally (side-side), vertically (up-down), and horizontally (extension-retraction)). A boom tracking system 134 may mechanically track and supply the tanker controller 120 with the position of the boom 130 in three dimensions. In one embodiment of the inventive concepts disclosed herein, the boom tracking system 134 may include a series of high-resolution resolvers configured to accurately and mechanically track the refueling boom position in all axes and in extension and retraction. The tanker controller 120 may determine the three-dimensional position of the boom male fitting based in part on the mechanically tracked refueling boom position. In addition, the tracking system 134, the boom 130 may include a plurality of subsystems to enable the tanker 110 to provide fuel to the receiver 150. A conduit system within the refueling boom 130 may provide a path for fuel to be pumped from storage within the tanker 110 through the conduit system to the receiver 150.

The memory 122 may comprise a tangible, non-transitory memory configured to communicate with the tanker controller 120, the tangible, non-transitory memory having instructions stored therein that, in response to execution by the tanker controller 120, cause the tanker controller 120 to perform the functions of the system 100.

A data link 140 may operatively couple the tanker controller 120 with a receiver controller 170 for data sharing between the two computers. Onboard the receiver 150, a receiver positioning system 152 (hereinafter receiver GNSS) may function to determine a precise positioning solution of the receiver aircraft 150 and operatively transmit the receiver position solution to the tanker controller 120 via the receiver controller 170 and the data link 140. Also sited on the receiver 150, a receiver receptacle 154 may function as a receptacle for mechanically coupling with the boom 130 to receive fuel inflight.

Each of the tanker 110 and the receiver 150 may employ air data sensors including a tanker Air Data Computer (ADC) 162 and a receiver ADC 164 to supply each FCC 142 144 with air data (e.g., altitude, airspeed, temperature, etc.) to assist the tanker controller 120 in generating the precise relative positioning solution.

FIG. 2 AAR

Figure 2:
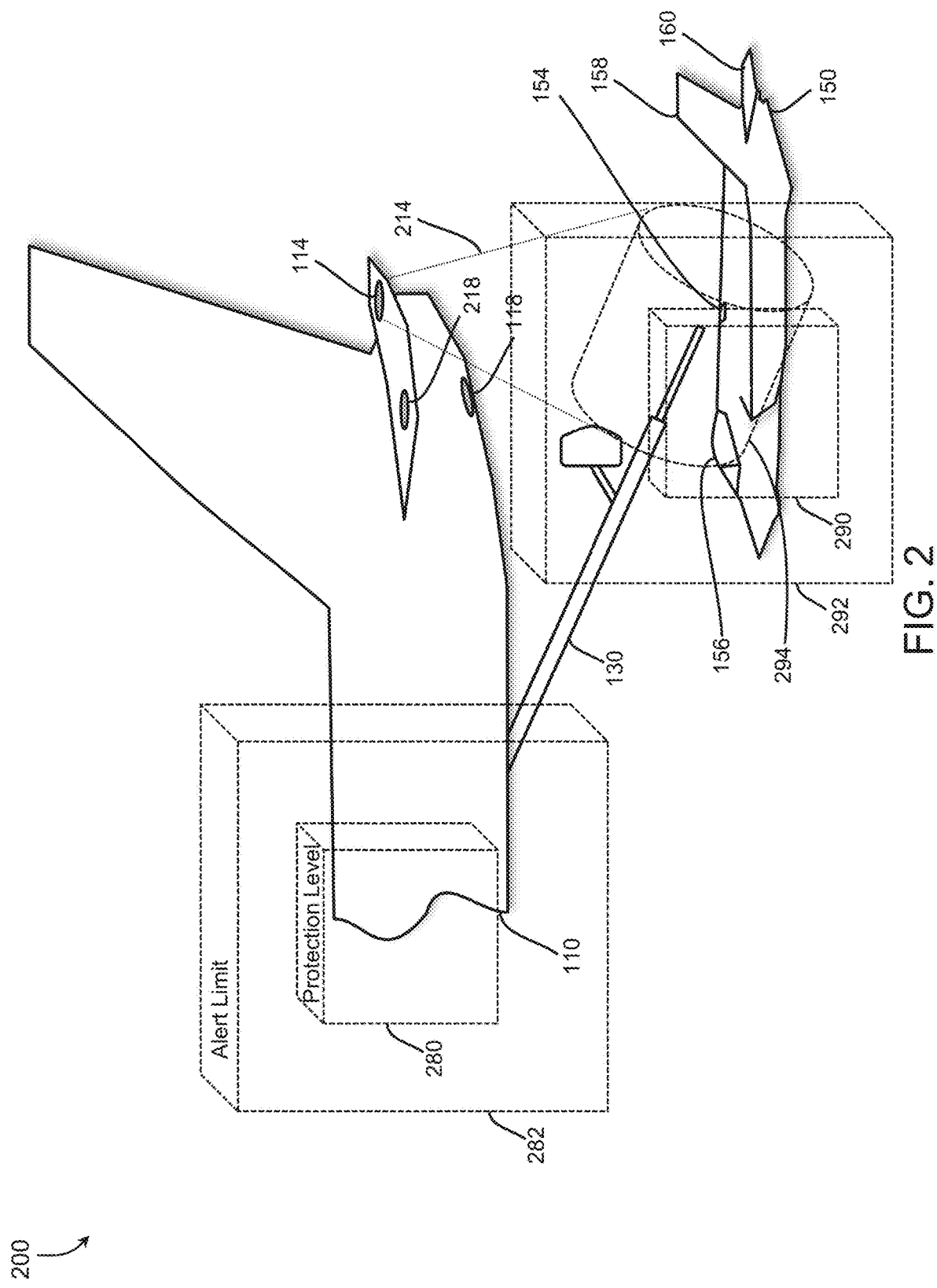
FIG. 2 is a diagram of a side view of AAR in accordance with an embodiment of the inventive concepts disclosed herein.

Referring now to FIG. 2, a diagram of a side view of AAR in accordance with an embodiment of the inventive concepts disclosed herein is shown. The side view 200 may indicate relative positions of the tanker 110 and receiver 150 while performing AAR. In AAR operation, the receiver 150 may be flown into a contact position either through pilot action or commanded by the tanker controller 120 via automated flight controls guided by the tanker controller 120 and communicated to the receiver controller 170 via the data link 140. Similarly, once within the contact position the tanker controller 120 may send a flight control solution via the datalink 140 to the receiver controller 170 to remain within the contact position.

Positioning/Relative Nav

In one embodiment of the inventive concepts disclosed herein, the tanker controller 120 may receive a positioning solution from the tanker GNSS 112 directly and from the receiver GNSS 152 via the data link 140. Based on the positioning solutions, the tanker controller 120 may then generate a high integrity relative position solution (HIRPS). The tanker controller 120 may determine the HIRPS using a plurality of methods to produce an accurate relative positioning solution. The relative positioning methods may bound a position error with a very high degree of certainty and assign a probability or confidence level sufficient for safe and functional positioning (formation).

One method may include a real time kinematic (RTK) analysis of a differential carrier phase GNSS measurements. Use of the differencing carrier phase measurements between the tanker GNSS 112 and the receiver GNSS 152 using RTK may remove common errors and increase accuracy of the HIRPS. In one embodiment of the inventive concepts disclosed herein, the receiver GNSS 152 may provide carrier phase measurements to the tanker controller 120 for accurate analysis. Another embodiment may include a receiver GNSS 152 without an ability to send the carrier phase measurements via the data link 140. In this case, the relative navigation solution may be less accurate, but still sufficiently accurate for a pilot monitored AAR.

In another method for highly accurate positioning solution, the tanker controller 120 may employ a high accuracy relative navigation method such as a Geometry Extra-Redundant Almost Fixed Solutions (GERAFS) technique to provide decimeter level accuracies with high integrity for airborne station keeping. GERAFS may be best described within U.S. Pat. No. 7,768,451 B2 to Wu, et al. which is incorporated by reference herein in its entirety.

Generally, Wu, et. al. teach receiving two or more sets of reference GPS measurements and using a geometric extra-redundant (GER) system of equations to solve for a single baseline vector to compute a float solution and use of a wide lane float solution to guarantee better than 99%, for example, system availability. Wu, et. al. continue where a plurality of almost fixed solutions are lumped together with a correctly fixed solution, forming what is termed an enlarged pull-in region (EPIR) to determine the almost fixed solution (AFS).

An additional method of generating the HIRPS may be found in U.S. Pat. No. 10,274,606 to Phan, et. al which is incorporated by reference herein in its entirety. Phan teaches determining precision navigation solutions via decorrelation of a GPS carrier-phase ambiguities derived from multiple-source GPS information via Least-squares AMBiguity Decorrelation Adjustment (LAMBDA) algorithms, and fixes a subset of the decorrelated integer ambiguities within the LAMBDA domain. To maintain high accuracy, a partial almost fix solution is generated using the subset of the decorrelated ambiguities to be fixed in the LAMBDA domain. The subset of decorrelated ambiguities is used to compute protection levels and the probability of almost fix (PAF), or that the navigation solution corresponding to the decorrelated ambiguities is within the region of correctly—fixed or low—error almost fixed ambiguities. The partial list of fixed ambiguities is used to generate the optimal navigation solution (floating point, partial almost-fix, or fully fixed) while maintaining protection levels within alert limits and PAF above the desired threshold.

Safety Boundaries

The tanker controller 120 may generate multiple and individual safety boundaries, GNSS-based and video-based, to ensure safe and effective AAR. A first set of GNSS-based safety boundaries may function to prevent a midair collision between the tanker 110 and the receiver 150. These GNSS-based safety boundaries may include a tanker protection level 280 and a tanker alert limit 282 based on the HIRPS. The protection level 280 may be generally defined as a calculated position based on the HIRPS inclusive of associated errors to create an uncertainty region. The uncertainty region may equate to the protection level 280. The alert limit 282 may be generally defined as an outer limit of uncertainty that if the protection level may reach the alert limit, the HIRPS may be invalid and further AAR should be discontinued.

Similarly, the tanker controller 120 may generate a receiver protection level 290 and a receiver alert limit 292 also based on the HIRPS. Each protection level 280 290 must be within each alert limit 282 292 in order for the system 100 to prevent midair and begin safe AAR. Should either protection level 280 290 touch or exceed either alert limit 282 292, the system 100 may declare an integrity event and send an alert.

Figure 4:
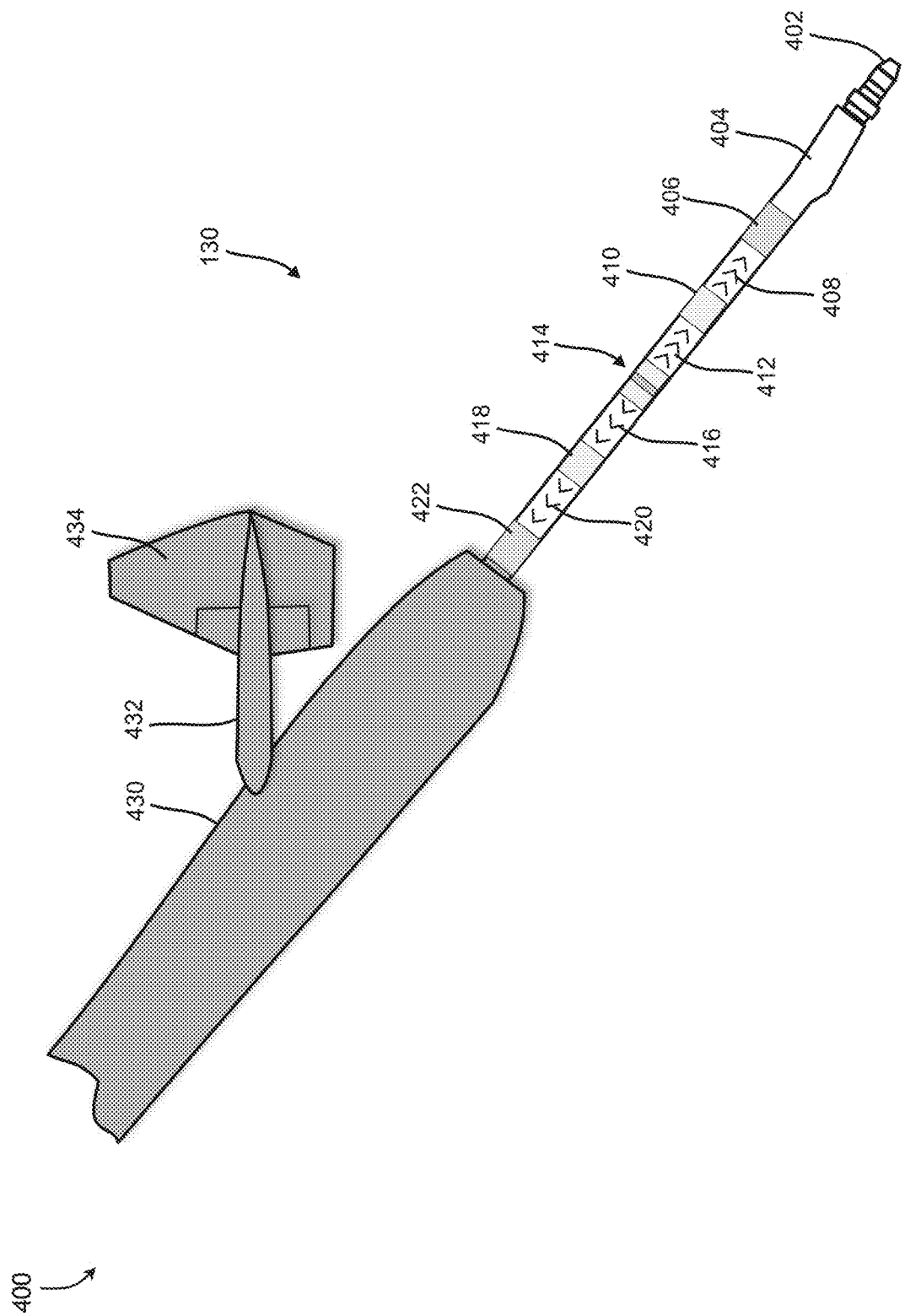
FIG. 4 is a diagram of a boom detail exemplary of one embodiment of the inventive concepts disclosed herein.

A video-based boom limit container 294 may function to protect the refueling boom 130. The boom limit container 294 may comprise a three-dimensional container surrounding a centered position of the boom male fitting 402 (FIG. 4). The boom limit container 294 may comprise a shaped volume (e.g., a sphere, cylinder, cuboid, etc.) having a dimension corresponding to a capability of the tanker 110 refueling boom 130 limits of movement. The boom limit container 294 may be oriented along a longitudinal axis of the receiver 150, but also oriented along a boom axis and centered on the tip of the refueling boom as shown to ensure boom maneuvering during AAR may not exceed the boom limits of movement. The boom limit container 294 may be fixed relative to the tanker 110 to ensure the boom 130 remains within an operational limit.

For example, a large sized tanker 110 may possess boom limits of an exemplary +/−30 degrees of a conical shape around the boom 130 and an extension limit of an exemplary +/−8 feet. Here, the corresponding boom limit container 294 may be large in size compared to a boom limit container 294 of a smaller tanker 130. The boom limit container 294 may comprise a three-dimensional container surrounding the receiver female fitting 254.

To ensure the receptacle 154 of the receiver 150 is within the boom limit container 294, the tanker controller 120 may compare the boom limit container 294 with the receiver position solution and generate and send a contact position report when the receiver 150 is stable within the boom limit container 294. Here a tanker 110 flight crew as well as a receiver 150 flight crew may be interested in knowing when the receiver position solution matches the boom limit container 294. Also, should the receptacle 154 on the receiver 150 begin to stray outside of the boom limit container 294, the tanker controller 120 may send an alert.

In one embodiment of the inventive concepts disclosed herein, the system 100 may function to monitor each of: 1) the at least two safety boundaries including each protection level 280 290 and each alert limit 282 292 and 2) the three-dimensional position of the receiver female fitting 254 relative to the boom limit container 294. Should any of these safety boundaries be approached, reached, or exceeded, the system 100 may send an alert if either protection level reaches either alert limit.

To avoid an alert, the system 100 may function to slave the receiver 150 to maintain the contact position during the AAR. The tanker controller 120 may function to determine a flight control solution for the receiver 150, send the receiver flight control solution via the data link 140 to the receiver controller 170 to command the receiver FCC 144 to position the receiver female fitting 254 (FIG. 3) within the boom limit container 294.

The receiver 150 may possess a plurality of physical characteristics able to be sensed by the camera suite 124 including a receiver canopy 156, the receptacle 154, a receiver left vertical tail 158, and a receiver left horizontal tail 160.

Each camera within the camera suite 124 may be limited by a camera field of view (FOV) 214. In one embodiment, the port camera 114 may have a FOV approximately equal to the size of the boom limit container 294 while in another embodiment, the FOV 214 may be much larger offering the capability of one or more of the cameras within the camera suite 124 to image a large size (e.g., C-17) aircraft.

While accurate enough for station keeping, the HIRPS is not alone sufficient for terminal guidance of the refueling boom 130 to the receptacle 154. However, once the receiver is within the receiver protection level 290, the tanker controller 120 may employ the camera suite 124 enabling machine vision over a small FOV 214 to provide terminal guidance of the boom 130 to the receptacle 154. Once an accurate relative position (with integrity) is established between tanker 110 and receiver 150, the machine vision problem may be reduced to a much smaller image set to process, simplifying the algorithm, reducing false detections, and increasing the probability of correctly identifying the refueling receptacle 154.

Contemplated herein, the HIRPS and subsequent safety boundaries may be solely determined by the tanker controller 120. However, in one embodiment, each of the tanker controller 120 and the receiver controller 170 may share the processing responsibility for cooperatively producing and maintaining the HIRPS. In this case, the receiver controller 170 may then supply the receiver FCC 144 with a flight control solution to maintain the desired position and station keeping relative to the tanker 110.

Figure 3:
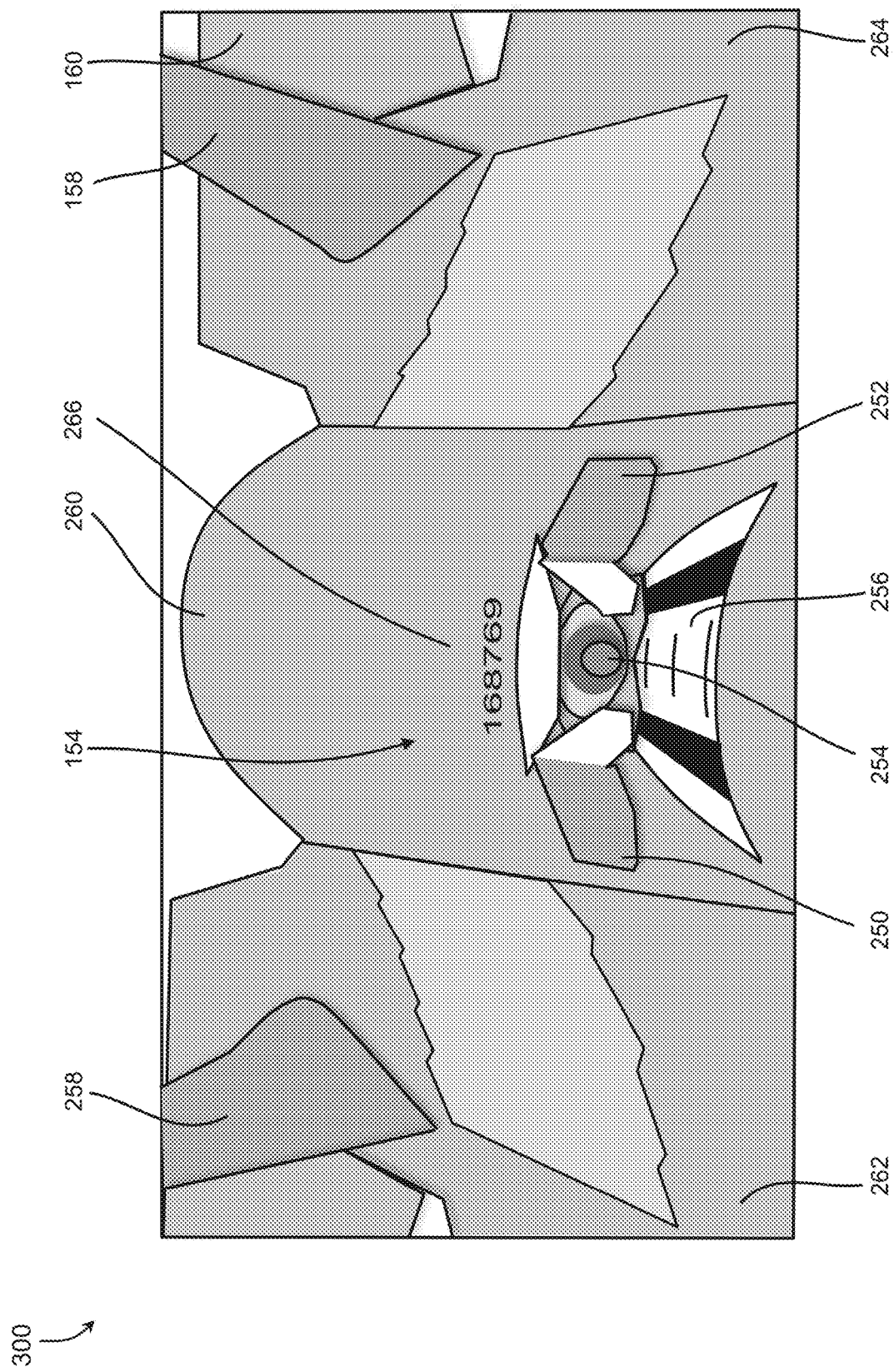
FIG. 3 is a diagram of a receiver detail exemplary of an embodiment of the inventive concepts disclosed herein.

FIG. 3 Receiver Detail

Referring now to FIG. 3, a diagram of a receiver detail exemplary of an embodiment of the inventive concepts disclosed herein is shown. In addition to the canopy 156, receiver 150 characteristics saved within the memory and conspicuous to the camera suite 124 may enable the machine vision to determine a locate the receiver female fitting 254. Such conspicuous elements may include a right vertical tail 258, a receiver right wing 262, a right door 250 of the AR compartment, a receiver number 266, a left door 252, a series of guide markings 256, a rear empennage 260, and a left wing 264.

Each of these conspicuous elements defining a plurality of aircraft types may be 1) stored within the memory 122 as a data set defining each element and usable by machine vision with the tanker controller 120 to ID the element, 2) maintain a relative arrangement including dimensions stored within the memory 122, 3) maintain a physical characteristic unlike another of the elements, and 4) maintain a conspicuous nature able to be sensed by one or more of the cameras within the camera suite 124. The tanker controller 120 may command a three-dimensional tracker algorithm to identify pixel position inputs from stereo images of the camera suite 124 and calculate a 3D position of the receptacle 154 in space.

In one embodiment of the inventive concepts disclosed herein, the camera suite 124 may be configured to sense a plurality of wavelengths associated with the receiver aircraft to sense a plurality of characteristics of the receiver aircraft 150. In one embodiment, the camera suite 124 may sense a visual spectrum and identify characteristics on the surface of the receiver aircraft 150. For example, the rear empennage 260 may be a specific color or shape and a distance between the left 258 and right 158 vertical tails may be significant to the machine vision calculations.

Some receiver 150 characteristics may include a size, a color, a shape, a receiver number 266, and the guide marking 256 associated with the receiver receptacle 154. Another embodiment may include an infrared camera capable of sensing an IR signature (e.g., engine heat, fuselage temperature differences, lights) of the receiver 150. Some tankers 110 may be specifically equipped with a lighting system configured to illuminate the receiver receptacle 154. Here, the camera suite 124 may employ a visual sensor to sense the lighted receiver receptacle 154 while also employing an IR sensor to sense the IR signature associated with the lighted receptacle 154. The system 100 may further employ an IR illuminator 218 (FIG. 2) associated with each IR camera to successfully illuminate and sense the receiver 150 positioned in the boom limit container 294.

FIG. 4 Boom Detail

Referring now to FIG. 4, a diagram of a boom detail exemplary of one embodiment of the inventive concepts disclosed herein is shown. The boom 130 also may maintain conspicuous characteristics apparent to the camera suite 124 and the machine vision capabilities within the tanker controller 120. The boom detail view 400 may indicate those characteristics specific to each boom for each tanker 110.

A boom male fitting 402 at the tip of the boom conduit may provide the connection point with the receiver female fitting 154. A boom extension 404 may function as the conduit for fuel and possess a capability of extension and retraction both powered and unpowered during refueling operations.

Color may be specifically conspicuous to the camera suite 124. Here, the boom extension may be painted with color primarily for boomer and receiver visual indication of maximum, desired, and minimum extensions of the boom extension 404. Generally, painted as a mirror on either side of a midpoint green with yellow apple 414, the boom markings may indicate a desired, minimum and maximum extension of the boom extension 404 during refueling.

As the boom extension 404 is nearly entirely retracted a min red stripe 406 may be visible. A set of min red chevrons 408, a min yellow stripe 410, a set of min yellow chevrons 412 may indicate an approach to maximum retraction. Similarly, a set of max yellow chevrons 416, a max yellow stripe 418, a set of max red chevrons 420, and a max red stripe 422 may indicate to the boomer and receiver pilot an approach to maximum extension from a boom housing 430.

Each of these boom characteristics may be stored as definitions within the memory 122 for use by the tanker controller 120 for machine vision recognition and boom 130 positioning for insertion in the receiver female fitting 254.

For control, many booms 130 may possess actuators within the tanker 110 fuselage for control of the boom position. On some tankers, a boom horizontal stabilizer 432 and boom vertical stabilizer 434 may provide an airfoil for boom positioning control. In this case, the tanker controller 120 may send commands to the airfoil actuators to deflect the airfoils and maneuver the boom 130.

FIG. 5 Logic

Figure 5:
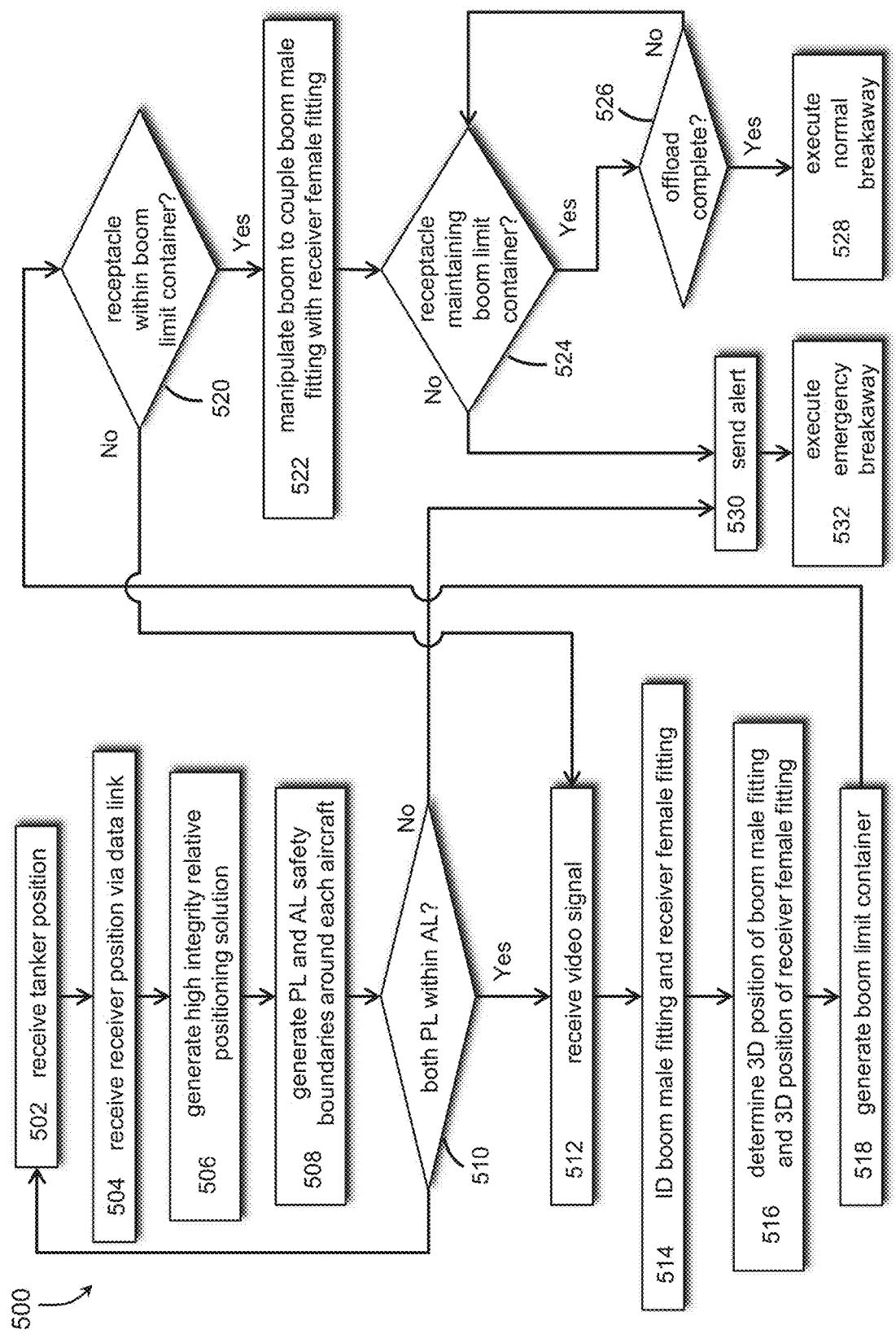
FIG. 5 is a diagram of a logic flow in accordance with one embodiment of the inventive concepts disclosed herein.

Referring now to FIG. 5, a diagram of a logic flow in accordance with one embodiment of the inventive concepts disclosed herein is shown. Steps 501 through 512 may be considered steps for determining the relative positioning solution while steps 514 through 520 may comprise the machine vision and AAR steps. Steps 502 through 510 may be continuously executed to maintain a safe separation between the two aircraft while steps 522 through 530 may provide a feedback loop to maintain safety.

A step 502 may receive a positioning solution from the tanker positioning system while a step 504 may include receive a positioning solution from the receiver positioning system via the data link. A step 506 may generate a HIRPS based on the received positioning solutions and a step 508 may generate safety boundaries around each aircraft including a protection level and an alert limit based on the HIRPS. A query 510 may compare the protection level to the alert limit of each aircraft to determine if the protection level is within the alert limit. Should the result of query 510 be negative, the logic may pass to step 530 to send an alert.

Should the result of query 510 be positive, the logic may pass to a step 512, where the tanker controller 120 may receive a video signal from the camera suite to enable machine vision methods to identify, at a step 514, based on the video signal, the boom male fitting 402 and the receiver female fitting 254. A step 516 may determine, based on the video signal, a three-dimensional position of the boom male fitting and a three-dimensional position of the receiver female fitting and a step 518 may generate the boom limit container based on the 3D position of the refueling boom.

A query 520 may question if the receptacle is within the boom limit container. Should the result be negative, the logic may pass to the step 512 to continue to receive the video signal. However, should the result of query 520 be positive, the logic may pass to a step 522 to manipulate the refueling boom to couple the boom male fitting with the receiver female fitting based on the three-dimensional position of the boom male fitting relative to the three-dimensional position of the receiver female fitting.

A query 524 may question if the receptacle is maintaining a position within the boom limit contain. Should the result be positive, the logic may pass to an additional query 526 questioning if the offload is complete. Should the result of query 526 be positive, the logic may pass to a step 528 to execute a normal breakaway. However, if the result of query 524 should be negative, the logic may pass to a step 530 to send an alert and, at a step 532, the tanker controller 120 may initiate a command to the tanker to execute an emergency breakaway.

The system 100 may be specifically configured to function on a current tanker 110 (e.g., KC-46) with a camera suite 124 installed. The addition of high integrity relative navigation algorithms and machine vision to current Remote Vision Systems may enable an AAR capability for so equipped boom refueled aircraft.

Figure 6A:
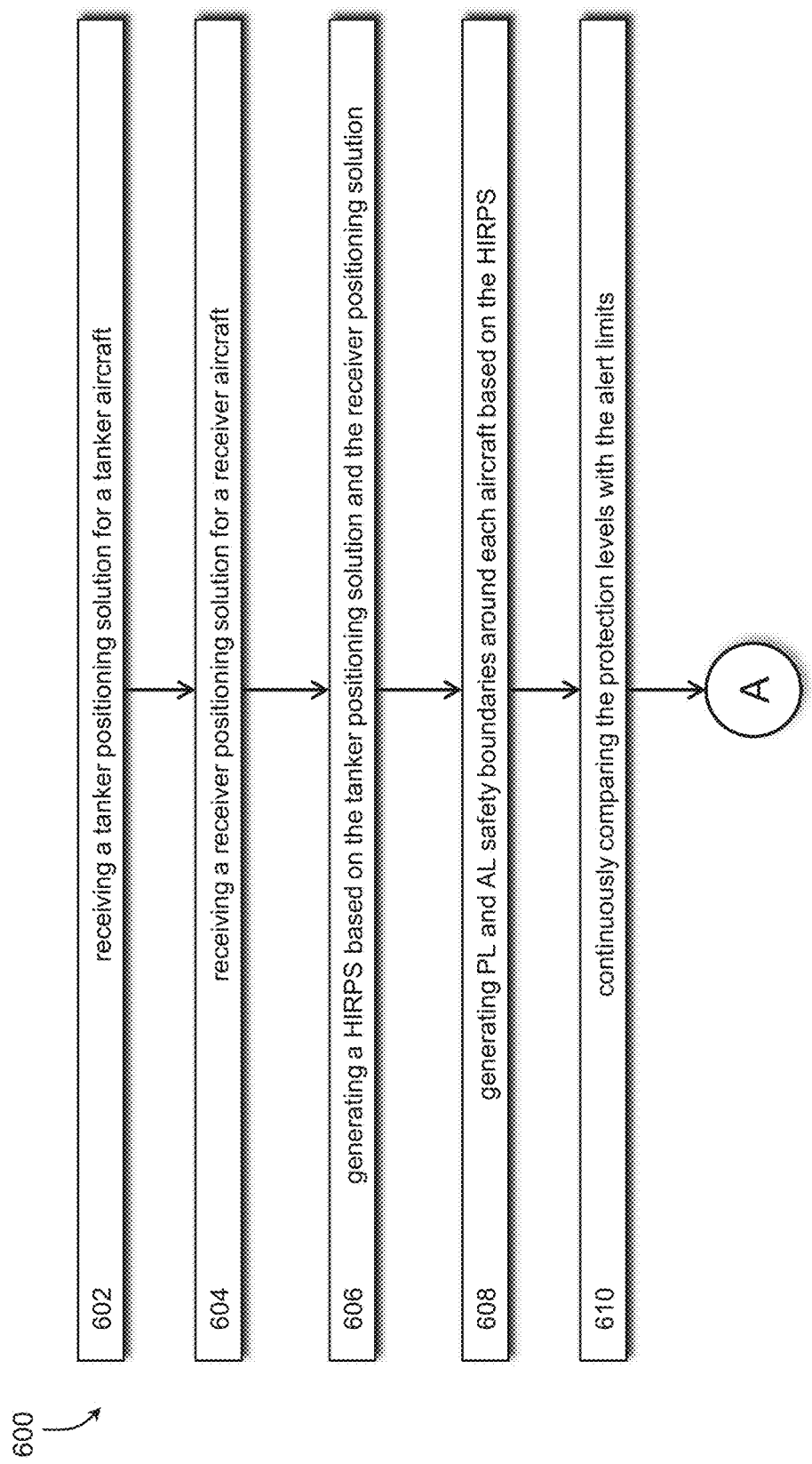
FIGS. 6A and 6B are diagrams of a method flow in accordance with one embodiment of the inventive concepts disclosed herein.
Figure 6B:
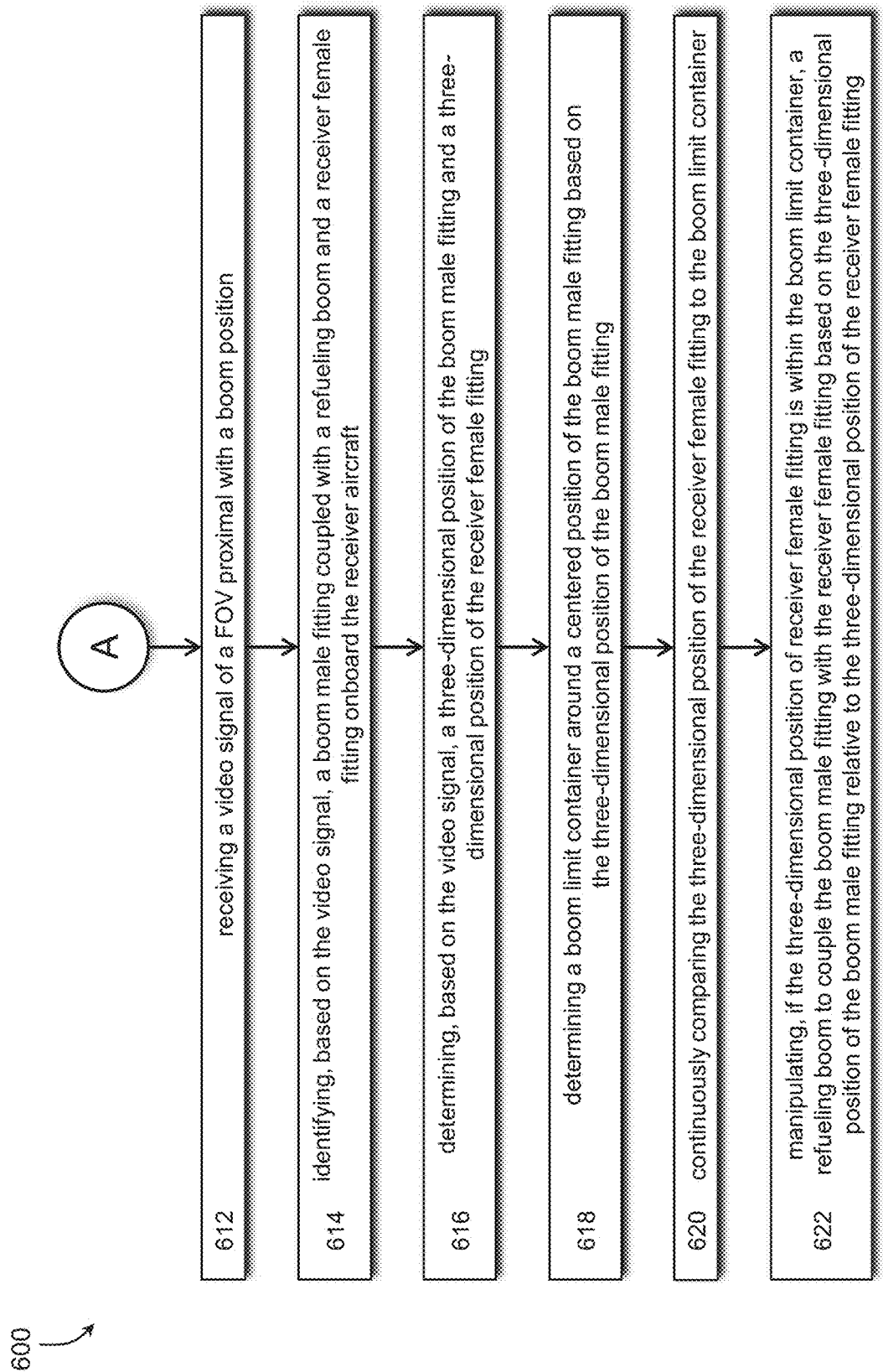

FIGS. 6A & 6B Method

Referring now to FIGS. 6A and 6B, diagrams of a method flow in accordance with one embodiment of the inventive concepts disclosed herein is shown. A method for automated boom placement in aerial refueling may comprise, at a step 602, receiving a tanker positioning solution for a tanker aircraft and, at a step 604, receiving a receiver positioning solution for a receiver aircraft. A step 606 may include generating a high integrity relative positioning solution based on the tanker positioning solution and the receiver positioning solution, and a step 608 may include generating at least two safety boundaries including a protection level and an alert limit around each aircraft based on the high integrity relative positioning solution while a step 610 may include continuously comparing each protection level to each alert limit.

A step 612 may include receiving a video signal of a FOV proximal with a boom position. A step 614 may include identifying, based on the video signal, a boom male fitting coupled with a refueling boom and a receiver female fitting onboard the receiver aircraft, and a step 616 may include determining, based on the video signal, a three-dimensional position of the boom male fitting and a three-dimensional position of the receiver female fitting. For boom safety, a step 618 may include determining a boom limit container around a centered position of the boom male fitting based on the three-dimensional position of the boom male fitting, and a step 620 may include continuously comparing the three-dimensional position of the receiver female fitting to the boom limit container. For AAR, a step 622 may include manipulating, if the three-dimensional position of receiver female fitting is within the boom limit container, a refueling boom to couple the boom male fitting with the receiver female fitting based on the three-dimensional position of the boom male fitting relative to the three-dimensional position of the receiver female fitting.

CONCLUSION

As will be appreciated from the above description, embodiments of the inventive concepts disclosed herein may provide a novel solution to AAR using high integrity relative positioning methods in cooperation with highly accurate machine vision systems.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for automated boom placement in aerial refueling, comprising:

- a tanker positioning system operatively coupled with a tanker flight control computer (FCC) onboard a tanker aircraft;
- a camera suite onboard the tanker aircraft;
- a boom manipulating system onboard the tanker aircraft configured to three dimensionally manipulate a refueling boom onboard the tanker aircraft, the refueling boom having a boom male fitting;
- a tanker controller onboard the tanker aircraft operatively coupled with the tanker positioning system, the tanker FCC, the camera suite, and the boom manipulating system;
- a data link operatively coupling the tanker controller with a receiver controller onboard a receiver aircraft, the receiver controller operatively coupled with a receiver positioning system and a receiver FCC, the receiver aircraft having a receiver female fitting;
- a tangible, non-transitory computer readable memory configured to communicate with the tanker controller, the tangible, non-transitory computer readable memory having instructions stored therein that, in response to execution by the tanker controller, cause the tanker controller to:
- receive a positioning solution from the tanker positioning system;
- receive a positioning solution from the receiver positioning system via the data link;
- generate a high integrity relative positioning solution (HIRPS) based on the received positioning solutions;
- generate at least two safety boundaries around each of the tanker aircraft and the receiver aircraft based on the HIRPS, the at least two safety boundaries including a tanker protection level and a tanker alert limit, a receiver protection level and a receiver alert limit, the protection levels smaller than the alert limits;
- receive a video signal from the camera suite, the camera suite configured for sensing a field of view (FOV) proximal with the refueling boom;
- identify, based on the video signal, the boom male fitting and the receiver female fitting;
- determine, based on the video signal, a three-dimensional position of the boom male fitting and a three-dimensional position of the receiver female fitting;
- generate a boom limit container around the boom male fitting based on the three-dimensional position of the boom male fitting;
- monitor each of: 1) the at least two safety boundaries and 2) the three-dimensional position of the receiver female fitting relative to the boom limit container;
- send an alert if either protection level reaches either alert limit and if the three-dimensional position of the receiver female fitting exceeds the boom limit container; and
- manipulate, if the three-dimensional position of the receiver female fitting is within the boom limit container, the refueling boom to couple the boom male fitting with the receiver female fitting based on the three-dimensional position of the boom male fitting relative to the three-dimensional position of the receiver female fitting.

2. The system for automated boom placement in aerial refueling of claim 1, wherein the HIRPS further includes a real time kinematic analysis of a differential carrier phase measurement.

3. The system for automated boom placement in aerial refueling of claim 1, wherein the boom limit container further comprises a three-dimensional container surrounding a centered position of the boom male fitting and wherein the tanker controller is further configured to send a contact position report when the monitoring of the three-dimensional position of the receiver female fitting is within the boom limit container.

4. The system for automated boom placement in aerial refueling of claim 1, wherein the tanker controller is further configured for sending a flight control solution via the data link to the receiver controller to command the receiver FCC to position the receiver female fitting within the boom limit container.

5. The system for automated boom placement in aerial refueling of claim 1, wherein the camera suite onboard the tanker aircraft further comprises at least two cameras configured for stereoscopic sensing of the FOV proximal with the refueling boom.

6. The system for automated boom placement in aerial refueling of claim 1, wherein the camera suite further comprises at least one camera configured for sensing a plurality of wavelengths.

7. The system for automated boom placement in aerial refueling of claim 1, wherein the boom manipulating system further comprises one of: at least one actuator and at least one airfoil coupled with the refueling boom and configured to maneuver the refueling boom in two axes and at least one actuator configured to extend and retract a boom extension.

8. The system for automated boom placement in aerial refueling of claim 1, wherein the boom manipulating system further includes a tracking system to mechanically track a refueling boom position and supply the tanker controller with the refueling boom position and wherein the tanker controller determines the three-dimensional position of the boom male fitting based in part on the mechanically tracked refueling boom position.

9. The system for automated boom placement in aerial refueling of claim 1, wherein identify, based on the video signal, the boom male fitting and the receiver female fitting further comprises a data set within the tangible, non-transitory computer readable memory, the data set including a definition of at least one characteristic of the receiver aircraft.

10. The system for automated boom placement in aerial refueling of claim 1, wherein monitor each of: 1) the at least two safety boundaries and 2) the three-dimensional position of the receiver female fitting relative to the boom limit container further comprises send an alert when one of: the receiver female fitting is approaching the boom limit container, and the tanker protection level is approaching the tanker alert limit and the receiver protection level is approaching the receiver alert limit.

11. The system for automated boom placement in aerial refueling of claim 1, wherein manipulate the refueling boom further comprises manipulate the refueling boom to disconnect the boom male fitting from the receiver female fitting upon sending of the alert.

12. A method for automated boom placement in aerial refueling, comprising:

receiving a tanker positioning solution for a tanker aircraft;

receiving a receiver positioning solution for a receiver aircraft;

generating a high integrity relative positioning solution based on the tanker positioning solution and the receiver positioning solution;

generating at least two safety boundaries around each of the tanker aircraft and the receiver aircraft based on the HIRPS, the safety boundaries including a protection level and an alert limit, the protection level smaller than the alert limit;

continuously comparing each protection level to each alert limit;

sending an alert if either protection level reaches either alert limit;

receiving a video signal of a FOV proximal with a boom position;

identifying, based on the video signal, a boom male fitting coupled with a refueling boom and a receiver female fitting onboard the receiver aircraft;

determining, based on the video signal, a three-dimensional position of the boom male fitting and a three-dimensional position of the receiver female fitting;

determining a boom limit container around a centered position of the boom male fitting based on the three-dimensional position of the boom male fitting;

continuously comparing the three-dimensional position of the receiver female fitting to the boom limit container; and manipulating, if the three-dimensional position of receiver female fitting is within the boom limit container, a refueling boom to couple the boom male fitting with the receiver female fitting based on the three-dimensional position of the boom male fitting relative to the three-dimensional position of the receiver female fitting.

13. The method for automated boom placement in aerial refueling of claim 12, wherein manipulating the refueling boom further includes disconnecting the boom male fitting from the receiver female fitting and sending an alert if the three-dimensional position of the receiver female fitting reaches a boundary of the boom limit container.

14. The method for automated boom placement in aerial refueling of claim 12, wherein manipulating the refueling boom further comprises one of: actuating at least one boom manipulating actuator and deflecting at least one airfoil coupled with the refueling boom.

15. The method for automated boom placement in aerial refueling of claim 12, wherein continuously comparing the three-dimensional position of the receiver female fitting to the boom limit container further comprises generating a contact position report when the three-dimensional position of the receiver female fitting is within the boom limit container.

* * * * *